(12) United States Patent
Moon et al.

(10) Patent No.: US 10,341,104 B2
(45) Date of Patent: Jul. 2, 2019

(54) ENCRYTION APPARATUS AND METHOD

(71) Applicant: SAMSUNG SDS CO., LTD., Seoul (KR)

(72) Inventors: Duk-Jae Moon, Seoul (KR); Ji-Hoon Cho, Seoul (KR); Kyu-Young Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 193 days.

(21) Appl. No.: 14/994,687

(22) Filed: Jan. 13, 2016

(65) Prior Publication Data

US 2017/0118021 A1    Apr. 27, 2017

(30) Foreign Application Priority Data

Oct. 23, 2015  (KR) .................. 10-2015-0148008

(51) Int. Cl.
*H04L 9/16* (2006.01)
*H04L 9/08* (2006.01)
*H04L 29/06* (2006.01)

(52) U.S. Cl.
CPC .............. *H04L 9/16* (2013.01); *H04L 9/0822* (2013.01); *H04L 63/0457* (2013.01)

(58) Field of Classification Search
CPC ...... H04L 9/16; H04L 9/0822; H04L 63/0457
See application file for complete search history.

(56) References Cited

U.S. PATENT DOCUMENTS

| 8,712,041 B2 | 4/2014 | Lee et al. | |
| 2010/0098244 A1* | 4/2010 | Ciet | H04L 9/002 380/29 |
| 2010/0303231 A1* | 12/2010 | Gorissen | H04L 9/065 380/210 |
| 2012/0099726 A1* | 4/2012 | Kim | H04L 9/08 380/44 |
| 2012/0170740 A1* | 7/2012 | Lee | H04L 9/0618 380/44 |
| 2012/0179919 A1 | 7/2012 | Farrugia et al. | |

FOREIGN PATENT DOCUMENTS

| KR | 10-2010-0020481 A | 2/2010 |
| KR | 10-2012-0079639 A | 7/2012 |

OTHER PUBLICATIONS

Communication dated May 31, 2017, issued by the Korean Intellectual Property Office in corresponding Korean Application No. 10-2015-0148008.

* cited by examiner

*Primary Examiner* — Ellen Tran
(74) *Attorney, Agent, or Firm* — Sughrue Mion, PLLC

(57) ABSTRACT

An encryption apparatus includes a table generator configured to generate a key table based on each of a plurality of encryption keys, the plurality of encryption keys having different attributes, generate a key-independent table independent of the plurality of encryption keys, and generate an encryption algorithm based on the key table and the key-independent table; and a transmitter configured to transmit the key table and the key-independent table to a client terminal, wherein the table generator and the transmitter are implemented by using at least one hardware processor.

11 Claims, 4 Drawing Sheets

ENCRYTION APPARATUS AND METHOD

CROSS-REFERENCE TO RELATED APPLICATION

This application claims priority to and the benefit of Korean Patent Application No. 10-2015-0148008, filed on Oct. 23, 2015, the disclosure of which is incorporated herein by reference in its entirety.

BACKGROUND

1. Field

Exemplary embodiments of the present disclosure relate to encryption technology.

2. Discussion of Related Art

A conventional table-based white-box implementation method has been implemented using only a single attribute encryption key. Accordingly, since a white-box implementation product has to be transmitted in its entirety, it has been difficult to control the transmission capacity.

Further, since the entire implementation product is distributed and is left to always exist in a terminal due to the distribution of the entire white-box implementation product, there were problems such as the use of the encryption function by an unauthorized user and the leakage of the entire implementation product due to the terminal being lost.

SUMMARY

The present disclosure is directed to an encryption apparatus and method.

According to an aspect of an exemplary embodiment, provided is an encryption apparatus, including: a table generator configured to generate a key table based on each of a plurality of encryption keys, the plurality of encryption keys having different attributes, generate a key-independent table independent of the plurality of encryption keys, and generate an encryption algorithm based on the key table and the key-independent table; and a transmitter configured to transmit the key table and the key-independent table to a client terminal, wherein the table generator and the transmitter are implemented by using at least one hardware processor.

The key table may include a static key table generated based on a static encryption key, which does not need to be updated, and a dynamic key table generated based on a dynamic encryption key, which needs to be updated.

The transmitter may be further configured to transmit the key table at a transmission time, the transmission time being varied according to an attribute of an encryption key that is used for generating the key table.

4. The encryption apparatus of claim 1, wherein the table generator is further configured to generate the key table having a size, which is varied according to an attribute of an encryption key that is used for generating the key table.

The table generator may be further configured to generate the dynamic key table based on an updated dynamic encryption key in response to the dynamic encryption key being updated, and update the encryption algorithm by using the dynamic key table that is generated based on the updated dynamic encryption key.

The transmitter may be further configured to transmit the dynamic key table generated based on the updated dynamic encryption key to the client terminal.

The table generator may be further configured to generate the encryption algorithm by changing an application location of the key table that is generated based on the each of the plurality of encryption keys according to at least one of the client terminal and a user of the client terminal.

According to an aspect of another exemplary embodiment, provided is an encryption method, including: generating a key table based on each of a plurality of encryption keys, the plurality of encryption keys having different attributes; generating a key-independent table independent of the plurality of encryption keys; generating an encryption algorithm based on the key table and the key-independent table; and transmitting the key table and the key-independent table to a client terminal.

The key table may include a static key table generated based on a static encryption key, which does not need to be updated, and a dynamic key table generated based on a dynamic encryption key, which needs to be updated.

The transmitting may include transmitting the key table at a transmission time, the transmission time being varied according to an attribute of an encryption key that is used for generating the key table.

The generating the key table may include generating the key table having a size, which is varied according to an attribute of an encryption key that is used for generating the key table.

The encryption method may further include generating the dynamic key table, based on an updated dynamic encryption key, in response to the dynamic encryption key being updated; and updating the encryption algorithm by using the dynamic key table that is generated based on the updated dynamic encryption key.

The encryption method may further include transmitting the dynamic key table generated based on the updated dynamic encryption key to the client terminal.

The generating the encryption algorithm may include changing an application location of the key table that is generated based on the each of the plurality of encryption keys according to at least one of the client terminal and a user of the client terminal.

According to an aspect of still another exemplary embodiment, provided is a computer-readable recording medium storing a program, which, when executed by a computer, causes the computer to perform a method including: generating a key table based on each of a plurality of encryption keys, the plurality of encryption keys having different attributes; generating a key-independent table independent of the plurality of encryption keys; generating an encryption algorithm based on the key table and the key-independent table; and transmitting the key table and the key-independent table to a client terminal.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present disclosure will be described with references to the accompanying drawings. The following description is provided in order to help a comprehensive understanding with respect to a method, apparatus, or system described herein or all of them. However, it is merely an example, and is not limited thereto.

In the following description with respect to exemplary embodiments of the present disclosure, when it is determined that a detailed description of a well-known technology related to the present disclosure can unnecessarily obscure a subject matter of the present disclosure, the description will be omitted. All terms used herein are terms defined by considering functions in the present disclosure, and may be different according to intentions or customs of a user, or an operator. Accordingly, the terms should be defined based on the description of this specification. The terms used herein are only for describing exemplary embodiments according to the present disclosure, and should not be interpreted to limit. Unless otherwise defined, the use of the singular form in the present document should not preclude the presence of more than one referent. It will be further understood that the terms "comprises," "comprising," "includes," and/or "including," when used herein, specify the presence of stated features, items, steps, operations, elements, or components or all of them, but do not preclude the presence or addition of one or more other features, items, steps, operations, elements, components, or groups thereof or all of them.

Figure 1:
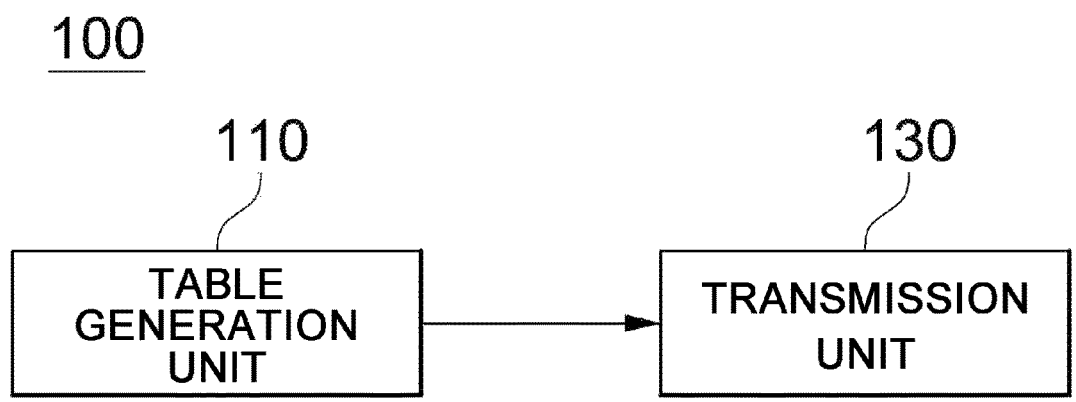
FIG. 1 is a diagram illustrating an encryption apparatus according to an exemplary embodiment.

FIG. 1 is a diagram illustrating an encryption apparatus according to an exemplary embodiment.

Referring to FIG. 1, an encryption apparatus 100 according to an exemplary embodiment of the present disclosure may include a table generation unit (or table generator) 110, and a transmission unit (or a transmitter) 130.

For example, the encryption apparatus 100 may be implemented as one component of an apparatus for providing encrypted content or a service to a client terminal such as a digital rights management (DRM) server, a Web service, etc.

The table generation unit 110 may generate a key table and a key-independent table, and generate a white-box cryptography (WBC) algorithm configured as the generated key table and key-independent table.

In this case, the key table and the key-independent table may mean a look-up table used for an encryption operation or decryption operation or both operations in the WBC algorithm.

Further, the key table may mean a look-up table which is directly generated from an encryption key, and the key-independent table may mean a look-up table which is not generated from the encryption key.

Meanwhile, the table generation unit 110 may generate the key table from each of a plurality of encryption keys, and in this case, the plurality of encryption keys may have different attributes.

In detail, for example, the encryption keys used for generating the key tables may include a group encryption key allocated to a user included in a specific user group, a private key allocated to a specific user, a terminal authentication key allocated to a specific terminal, a session key generated for each communication session, a content encryption key, a data encryption key, a message authentication key, etc. However, the attributes of the encryption keys used for generating the key table in the table generation unit 110 is not limited to the example described above, and in addition to the examples described above, encryption keys having various attributes may be used according to a service environment to which the encryption apparatus 100 is applied.

Figure 2:
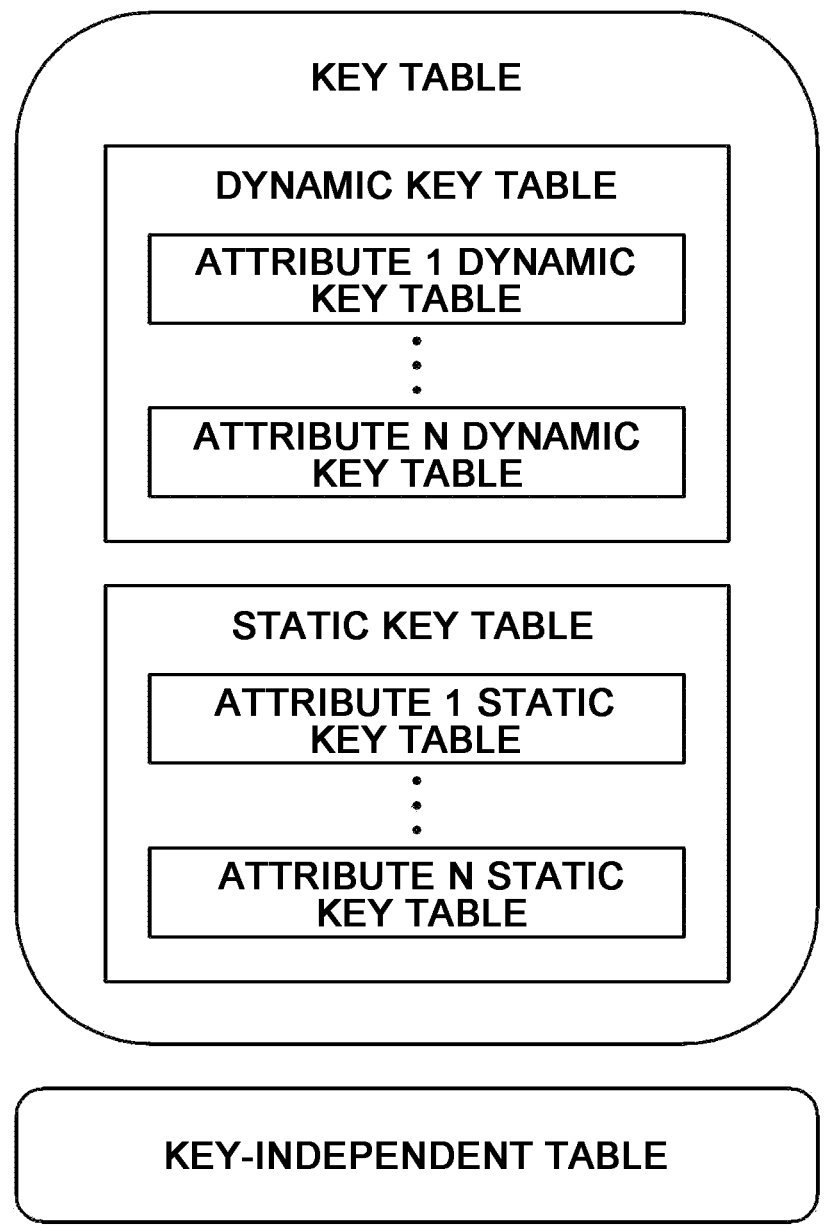
FIG. 2 is a diagram illustrating a structure of a key table.

Meanwhile, the key tables generated from encryption keys, respectively, may be classified as a static key table and a dynamic key table as shown in FIG. 2.

In this case, the static key table may mean a key table generated from a static encryption key in which an update is not required, and the dynamic key table may mean a key table generated from a dynamic encryption key in which a periodic or aperiodic update is required.

In detail, for example, the static encryption key may mean an encryption key having the same lifespan as the service or the terminal like the terminal authentication key, the group key, etc.

Further, the dynamic encryption key may mean an encryption key which is periodically or aperiodically updated like the session key, the content encryption key, the data encryption key, the message authentication key, etc.

Meanwhile, according to an exemplary embodiment of the present disclosure, the table generation unit 110 may generate the key table by changing the size of the key table generated from each encryption key according to the attribute of the encryption key used for generating the key table.

For example, the table generation unit 110 may generate the dynamic key table generated from the dynamic encryption key updated with a relatively short period like the session key to have a smaller size than the dynamic key table generated from the dynamic encryption key updated with a long period. Accordingly, as described later, the transmission capacity of the dynamic key table transmitted to the client terminal may be flexibly controlled according to the update of the dynamic encryption key.

Further, according to an exemplary embodiment of the present disclosure, the table generation unit 110 may change an application location of the key table for each attribute in the WBC algorithm generated according to the client terminal or a user of the client terminal.

Meanwhile, since the static key table generated by the table generation unit 110 is generated from a static encryption key, the static key table may be not changed after an initial generation, but in the case of the dynamic key table, the dynamic key table may need to be changed whenever the dynamic encryption key used for generating a corresponding key table is changed.

Accordingly, according to an exemplary embodiment of the present disclosure, when the dynamic encryption key used for generating the dynamic key table is updated, the table generation unit 110 may generate a new dynamic key table from the updated dynamic encryption key, and change the dynamic key table generated from the dynamic encryption key before updating into the generated new dynamic key table.

The transmission unit 130 may transmit the key tables and the key-independent tables generated by the table generation unit 110 to the client terminal.

In this case, according to an exemplary embodiment of the present disclosure, the transmission unit 130 may transmit the key table by varying the transmission time of the key tables according to the attribute of the encryption key used for generating the key table.

As one example, the transmission unit 130 may transmit the dynamic key table used for the encryption together with the encrypted data to the client terminal when transmitting the encrypted data after transmitting the static key table to the client terminal when transmitting to the client terminal and providing an application for providing the service.

As another example, when transmitting to the client terminal and providing an application for service provision, the transmission unit 130 may transmit the remaining dynamic key table together with the encrypted data when transmitting the encrypted data using a corresponding dynamic key table to the client table, after transmitting the dynamic key table generated from the encryption key having a relatively long update period in the static key table and the dynamic key table.

Meanwhile, the key table transmission method by the transmission unit 130 is not limited to the example described above, and in addition to the example described above, may be performed in various manners according to an encryption key policy, a communication environment, a transmission capacity, efficiency of WBC algorithm implementation, etc.

Meanwhile, according to an exemplary embodiment of the present disclosure, after transmitting the dynamic key table generated by the table generation unit 110 to the client terminal, when the transmitted dynamic key table is updated, the transmission unit 130 may allow the client terminal to update the dynamic key table which is previously transmitted by transmitting the updated dynamic key table to the client terminal.

Meanwhile, according to an exemplary embodiment of the present disclosure, the table generation unit 110 and the transmission unit 130 shown in FIG. 1 may be implemented in one or more computing devices including one or more processors and a computer-readable recording medium connected to the processors. The computer-readable recording medium may be located inside or outside the processors, and be connected to the processors by various well-known means. The processor located inside the computing device may allow each computing device to operate according to the exemplary embodiment described herein. For example, the processor may execute an instruction stored in the computer-readable recording medium, and when the instruction stored in the computer-readable recording medium is executed by the processor, the processor may allow the computing device to execute operations according to the exemplary embodiment described herein. The processor may include a central processing unit (CPU), a microprocessor, or the like.

Figure 3:
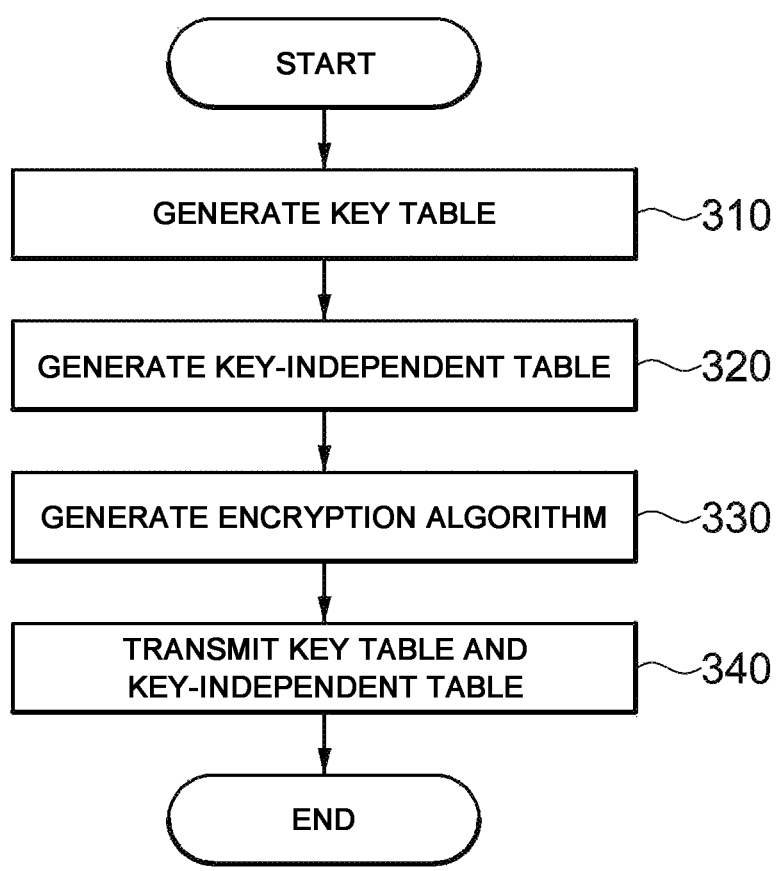
FIG. 3 is a flowchart for describing an encryption method according to an exemplary embodiment.

FIG. 3 is a flowchart for describing an encryption method according to an exemplary embodiment.

Referring to FIG. 3, the encryption apparatus 100 may generate the key table from each of the plurality of encryption key having different attributes (310).

In this case, the generated key table may include the static key table generated from the static encryption key for which the update is not required, and the dynamic key table generated from the dynamic encryption key which is periodically or aperiodically updated.

Meanwhile, according to an exemplary embodiment of the present disclosure, the encryption apparatus 100 may generate the key table by varying the size of the key table generated from each encryption key according to the attribute of the encryption key used for generating the key table. For example, the table generation unit 110 may generate a dynamic key table, generated from the dynamic encryption key updated with a relatively short period like a session key, that has a smaller size than a dynamic key table generated from the dynamic encryption key updated with a long period.

After this, the encryption apparatus 100 may generate the key-independent table independent of the encryption key used for generating the key table (320).

After this, the encryption apparatus 100 may generate the WBC algorithm configured as the generated key table and key-independent table (330).

In this case, according to an exemplary embodiment of the present disclosure, the encryption apparatus 100 may change the application location of the key table for each attribute in the WBC algorithm generated according to the client terminal, a user of the client terminal, or a service user.

After this, the encryption apparatus 100 may provide the generated key table and key-independent table to the client terminal (340).

In this case, the encryption apparatus 100 may transmit the key table to the client terminal by varying the transmission time of the key table generated according to the attribute of the encryption key used for generating the key table.

Figure 4:
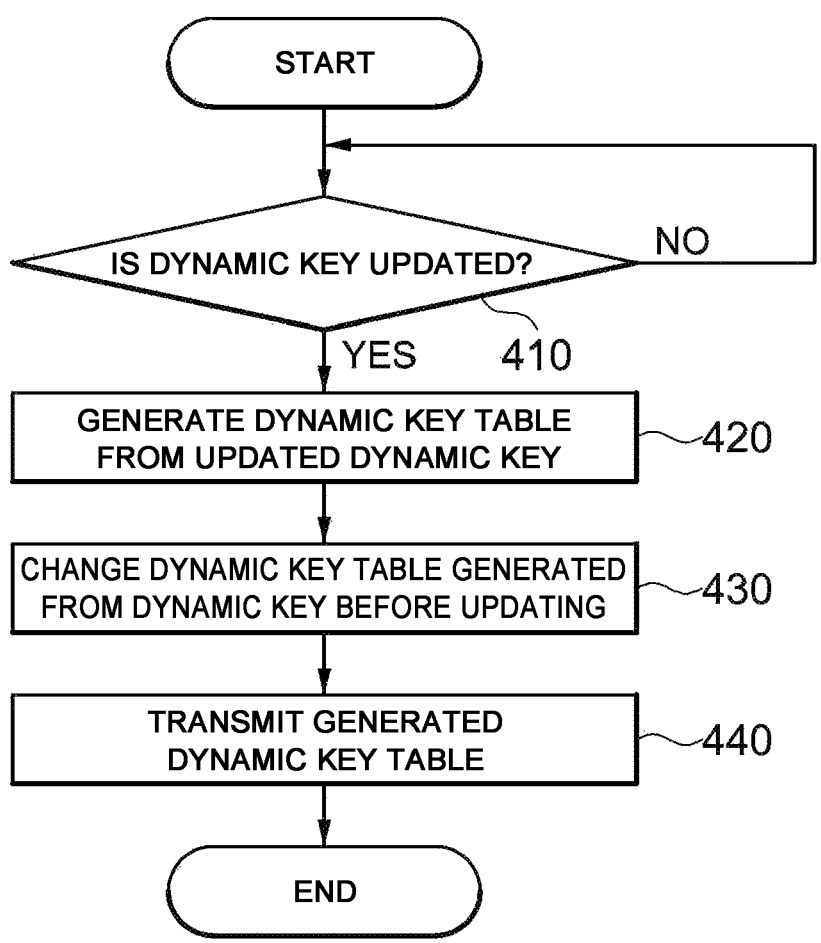
FIG. 4 is a flowchart for describing an operation of updating a dynamic key table according to an exemplary embodiment.

FIG. 4 is a flowchart for describing an operation of updating a dynamic key table according to an exemplary embodiment.

Referring to FIG. 4, when the dynamic key used for generating the dynamic key table is updated (410), the encryption apparatus 100 may generate the dynamic key table from the updated dynamic key (420).

After this, the encryption apparatus 100 may change the dynamic key table generated from the dynamic key before updating among the dynamic key tables included in the WBC algorithm into the dynamic key table generated from the updated dynamic key (430).

After this, the encryption apparatus 100 may transmit the dynamic key table generated from the updated dynamic key to the client terminal (440).

Meanwhile, in the flowcharts shown in FIGS. 3 and 4, the method is described by being divided into a plurality of operations, but at least one portion of the operations may be performed by changing the order, be performed by being combined with another operation, be omitted, be performed by being divided into sub-operations, or be performed by adding one or more operations which are not shown.

Meanwhile, an exemplary embodiment of the present disclosure may include a computer-readable recording medium including a program which is executable in a computer. The computer-readable recording medium may include a program instruction, a local data file, a local data structure, etc. alone or in combination. The computer readable recording medium may be specially designed and be configured for the present disclosure, or may be a medium which is generally used in the computer software field. Examples of the computer-readable recording medium may include a hard disk, a magnetic media such as a floppy disk and a magnetic tape, an optical recording media such as a compact disk (CD)-ROM and a digital video disk (DVD), a magneto-optical media such as a floptical disk, and a hardware device which is specially configured to store and execute a program instruction such as read-only memory (ROM), random access memory (RAM), flash memory, etc. Examples of the program instruction may include not only machine code made by a compiler but also high-level language code which is executable by a computer using an interpreter, etc.

According to exemplary embodiments of the present disclosure, transmission efficiency of the key table may be improved by implementing the key tables that are different from each other according to the attribute using the keys having various attributes, and selectively transmitting the key table when updating the keys.

Further, since the entire implementation product of the encryption algorithm does not exist in the client terminal, leakage of the entire implementation product by an attacker may be fundamentally blocked, and stability may be increased.

While the exemplary embodiments of the present disclosure are described in detail above, it will be understood by those of ordinary skill in the art that various changes and modifications in form and details may be made therein without departing from the spirit and scope as defined by the following claims. Accordingly, the scope of the present disclosure is not limited by the exemplary embodiments of the present disclosure, it is intended that the present disclosure covers all such modifications and changes of those of ordinary skill in the art derived from a basic concept of the appended claims, and their equivalents.

What is claimed is:

1. An encryption apparatus, comprising:
   a table generator configured to generate a key table based on each of a plurality of encryption keys, the plurality of encryption keys having different attributes, generate a key-independent table independent of the plurality of encryption keys, and generate an encryption algorithm based on the key table and the key-independent table; and
   a transmitter configured to transmit the key table and the key-independent table to a client terminal,
   wherein the transmitter is further configured to transmit the key table at a transmission time, the transmission time being varied according to an attribute of an encryption key that is used for generating the key table,
   wherein the table generator is further configured to generate the encryption algorithm by changing an application location in the encryption algorithm of the key table that is generated based on the each of the plurality of encryption keys according to at least one of the client terminal and a user of the client terminal, and
   wherein the table generator and the transmitter are implemented by using at least one hardware processor.

2. The encryption apparatus of claim 1, wherein the key table comprises a static key table generated based on a static encryption key, which does not need to be updated, and a dynamic key table generated based on a dynamic encryption key, which needs to be updated.

3. The encryption apparatus of claim 1, wherein the table generator is further configured to generate the key table having a size, which is varied according to the attribute of the encryption key that is used for generating the key table.

4. The encryption apparatus of claim 2, wherein the table generator is further configured to generate the dynamic key table based on an updated dynamic encryption key in response to the dynamic encryption key being updated, and update the encryption algorithm by using the dynamic key table that is generated based on the updated dynamic encryption key.

5. The encryption apparatus of claim 4, wherein the transmitter is further configured to transmit the dynamic key table generated based on the updated dynamic encryption key to the client terminal.

6. An encryption method, comprising:
   generating a key table based on each of a plurality of encryption keys, the plurality of encryption keys having different attributes;
   generating a key-independent table independent of the plurality of encryption keys;
   generating an encryption algorithm based on the key table and the key-independent table; and
   transmitting the key table and the key-independent table to a client terminal,
   wherein the transmitting comprises transmitting the key table at a transmission time, the transmission time being varied according to an attribute of an encryption key that is used for generating the key table, and
   wherein the generating the encryption algorithm comprises changing an application location in the encryption algorithm of the key table that is generated based on the each of the plurality of encryption keys according to at least one of the client terminal and a user of the client terminal.

7. The encryption method of claim 6, wherein the key table comprises a static key table generated based on a static encryption key, which does not need to be updated, and a dynamic key table generated based on a dynamic encryption key, which needs to be updated according to an update of the dynamic encryption key.

8. The encryption method of claim 6, wherein the generating the key table comprises generating the key table having a size varied according to the attribute of the encryption key that is used for generating the key table.

9. The encryption method of claim 7, further comprising:
   generating the dynamic key table, based on an updated dynamic encryption key, in response to the dynamic encryption key being updated; and
   updating the encryption algorithm by using the dynamic key table generated based on the updated dynamic encryption key.

10. The encryption method of claim 9, further comprising:
    transmitting the dynamic key table, generated based on the updated dynamic encryption key, to the client terminal.

11. A non-transitory computer-readable recording medium storing a program, which, when executed by a computer, causes the computer to perform a method comprising:
    generating a key table based on each of a plurality of encryption keys, the plurality of encryption keys having different attributes;
    generating a key-independent table independent of the plurality of encryption keys;
    generating an encryption algorithm based on the key table and the key-independent table; and
    transmitting the key table and the key-independent table to a client terminal,
    wherein the transmitting comprises transmitting the key table at a transmission time, the transmission time being varied according to an attribute of an encryption key that is used for generating the key table, and
    wherein the generating the encryption algorithm comprises changing an application location in the encryption algorithm of the key table that is generated based on the each of the plurality of encryption keys according to at least one of the client terminal and a user of the client terminal.

* * * * *